(12) United States Patent
Cooley (10) Patent No.: US 8,479,299 B1
(45) Date of Patent: Jul. 2, 2013

(54) STRATEGICALLY REDUCING THE ACCURACY OF GEOTAGS IN DIGITAL PHOTOGRAPHS

(75) Inventor: Shaun P. Cooley, El Segundo, CA (US)

(73) Assignee: Symantec Corporation, Mountain View, CA (US)

(*) Notice: Subject to any disclaimer, the term of this patent is extended or adjusted under 35 U.S.C. 154(b) by 316 days.

(21) Appl. No.: 13/048,787

(22) Filed: Mar. 15, 2011

(51) Int. Cl.
*G06F 7/04* (2006.01)

(52) U.S. Cl.
USPC .......................................................... 726/26

(58) Field of Classification Search
USPC ......... 726/22, 26, 27, 30; 455/456.1; 707/918
See application file for complete search history.

(56) References Cited

U.S. PATENT DOCUMENTS

| | | | |
|---|---|---|---|
| 2007/0150479 A1* | 6/2007 | Issa et al. | 707/10 |
| 2009/0077129 A1* | 3/2009 | Blose | 707/104.1 |
| 2009/0327229 A1* | 12/2009 | O'Connor et al. | 707/3 |
| 2010/0076968 A1* | 3/2010 | Boyns et al. | 707/732 |
| 2011/0129120 A1* | 6/2011 | Chan | 382/103 |

* cited by examiner

*Primary Examiner* — Beemnet Dada
(74) *Attorney, Agent, or Firm* — Brill Law Office; Jeffrey Brill (57) ABSTRACT

The accuracy of geotag information embedded in digital photographs is reduced. Network traffic is monitored, and transmission of a file stream comprising a digital photograph is identified. A geotag is identified in the file stream, as well as integrity verification information. It is determined that the identified geotag corresponds to a private location. The identified geotag is modified so as to reduce the accuracy of its content. Once the geotag is modified, the integrity verification information is updated to account for the modified geotag.

18 Claims, 4 Drawing Sheets

STRATEGICALLY REDUCING THE ACCURACY OF GEOTAGS IN DIGITAL PHOTOGRAPHS

TECHNICAL FIELD

This disclosure pertains generally to protecting the privacy of computer users, and more specifically to strategically reducing the accuracy of geotag information embedded in digital photographs.

BACKGROUND

Many digital cameras automatically tag photographs with the latitude and longitude of the location at which each picture is taken. This is true of both standalone digital cameras and digital cameras in phones and other devices. Additionally, even where a digital camera does not add geotags automatically, it commonly offers this feature to its users, many of whom elect to add this information to their photographs.

Having geotags present in digital photographs can be extremely useful for organization and browsing. However, many digital photographs containing geotags are shared online without users even realizing that they are exposing the locations at which the photographs were taken to the world. Although this is not an issue for photographs of well known or public locations (e.g., the Empire State Building or the Golden Gate Bridge), it can be a concern where private locations or individual people are photographed. For example, many users may not wish to make the exact location of their home or work place available online.

Sites exist which strip geotags from all photographs. However, this extreme can also be undesirable. As noted above, geotags are very useful, and in many cases do not create a privacy concern. Furthermore, even where a user does not wish to make an exact location public, it would still be desirable to obtain the organizational benefits provided by geotagging.

It would be desirable to address these issues.

SUMMARY

A geotag accuracy reducing management system strategically reduces the accuracy of geotag information embedded in digital photographs. Network traffic between at least one client and at least one server is monitored. This can comprise monitoring network traffic outbound from a client and/or monitoring network traffic inbound to a server. Transmission of a file stream comprising a digital photograph is identified in the monitored network traffic, for example by detecting an identifier of a specific digital photograph file format. A geotag is identified in the identified file stream, as well as integrity verification information. The identified integrity verification information can comprise at least one cyclical redundancy check or checksum specific to the digital photograph file format. It is determined that the identified geotag corresponds to a private location. In some embodiments, a private locations list is maintained, containing locations to be kept private by geotag accuracy reduction in digital photographs. In such embodiments, determining that the identified geotag corresponds to a private location can further comprise comparing the location of the identified geotag to the content of the private locations list.

The identified geotag is modified so as to reduce the accuracy of its content. In some embodiments, reducing the accuracy of a geotag can comprise selecting a random direction, selecting a random distance within a specific range, and modifying the content of the geotag by the selected random distance along the selected random direction. Modifying the identified geotag so as to reduce accuracy of its content can also comprise determining that the geotag corresponds to a private location within a specific region, and modifying the content of the geotag to identify a specific point not comprising a private location within that specific region, such as the geographical center of a city. In some embodiments, the private locations list can further contain specific directives for reducing the accuracy of geotags corresponding to specific locations. In such embodiments, modifying the geotag can comprise determining that the geotag corresponds to a specific private location on the private locations list, and modifying the content of the geotag according to a specific directive on the private locations list for reducing the accuracy of geotags corresponding to that specific location. In any case, once the geotag is modified, the integrity verification information is updated to account for the modified geotag.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
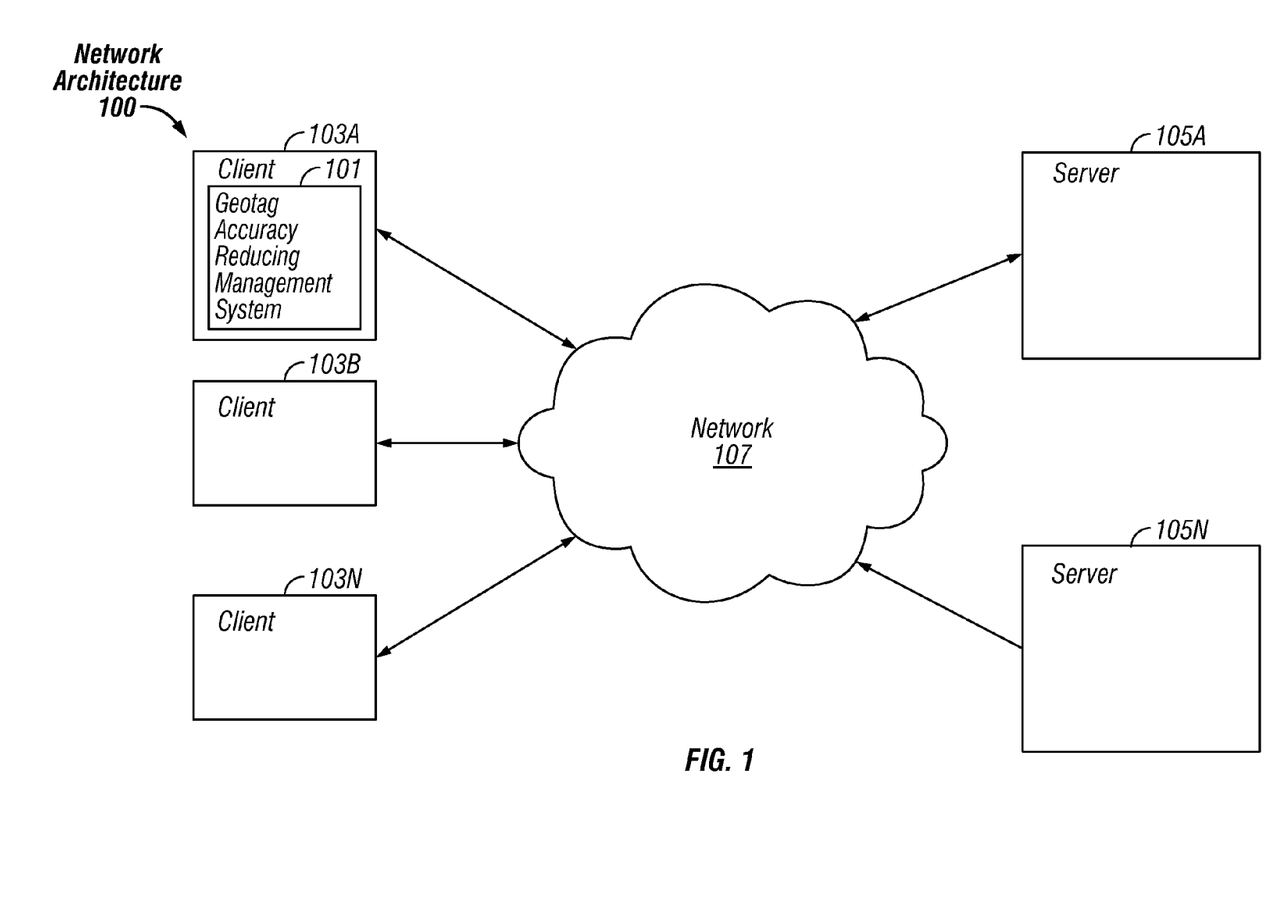
FIG. 1 is a block diagram of an exemplary network architecture in which a geotag accuracy reducing management system can be implemented, according to some embodiments.

FIG. 1 is a block diagram illustrating an exemplary network architecture 100 in which a geotag accuracy reducing management system 101 can be implemented. The illustrated network architecture 100 comprises multiple clients 103A, 103B and 103N, as well as multiple servers 105A and 105N. In FIG. 1, the geotag accuracy reducing management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
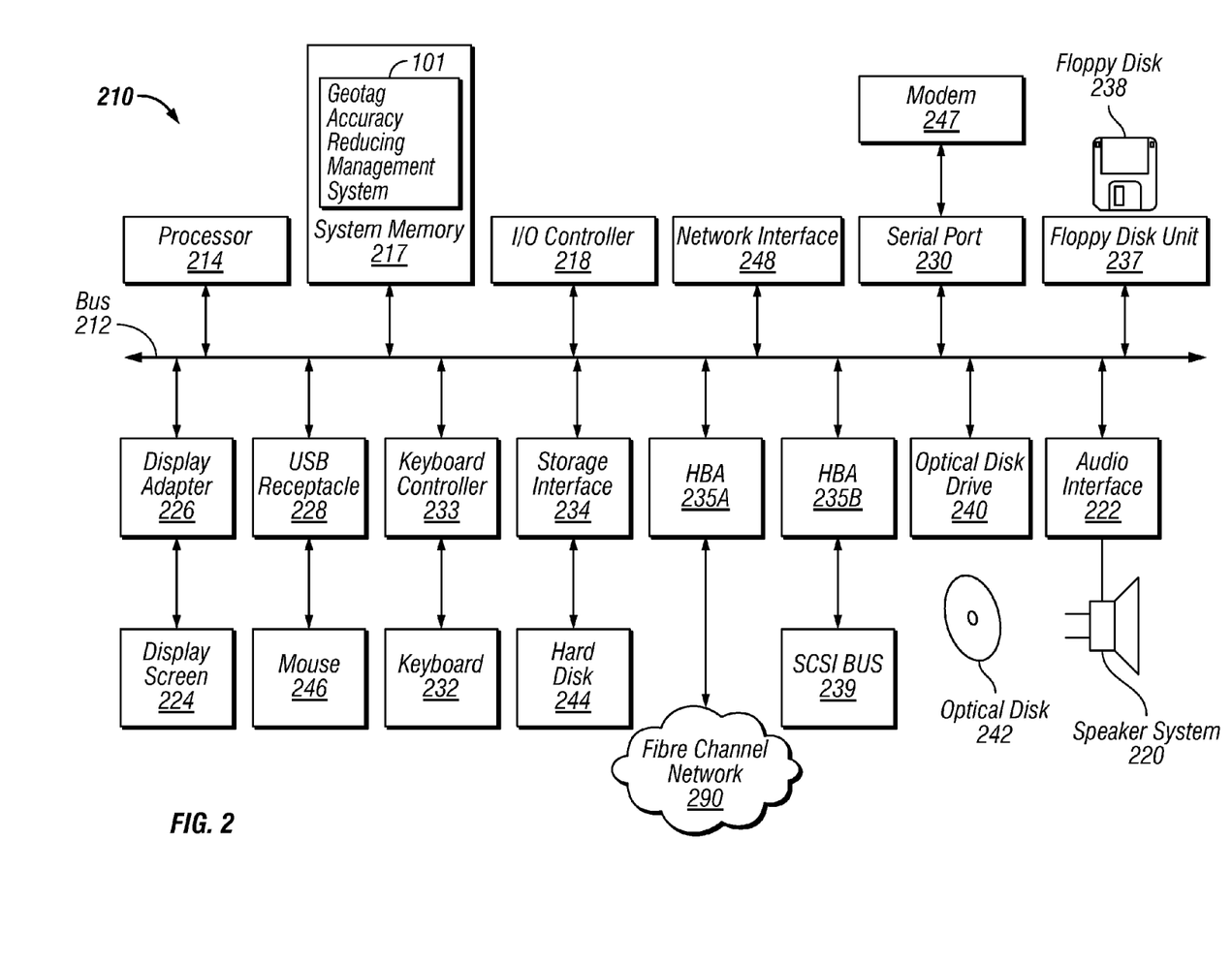
FIG. 2 is a block diagram of a computer system suitable for implementing a geotag accuracy reducing management system, according to some embodiments.

FIG. 2 is a block diagram of a computer system 210 suitable for implementing a geotag accuracy reducing management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the geotag accuracy reducing management system 101 is illustrated as residing in system memory 217. The workings of the geotag accuracy reducing management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
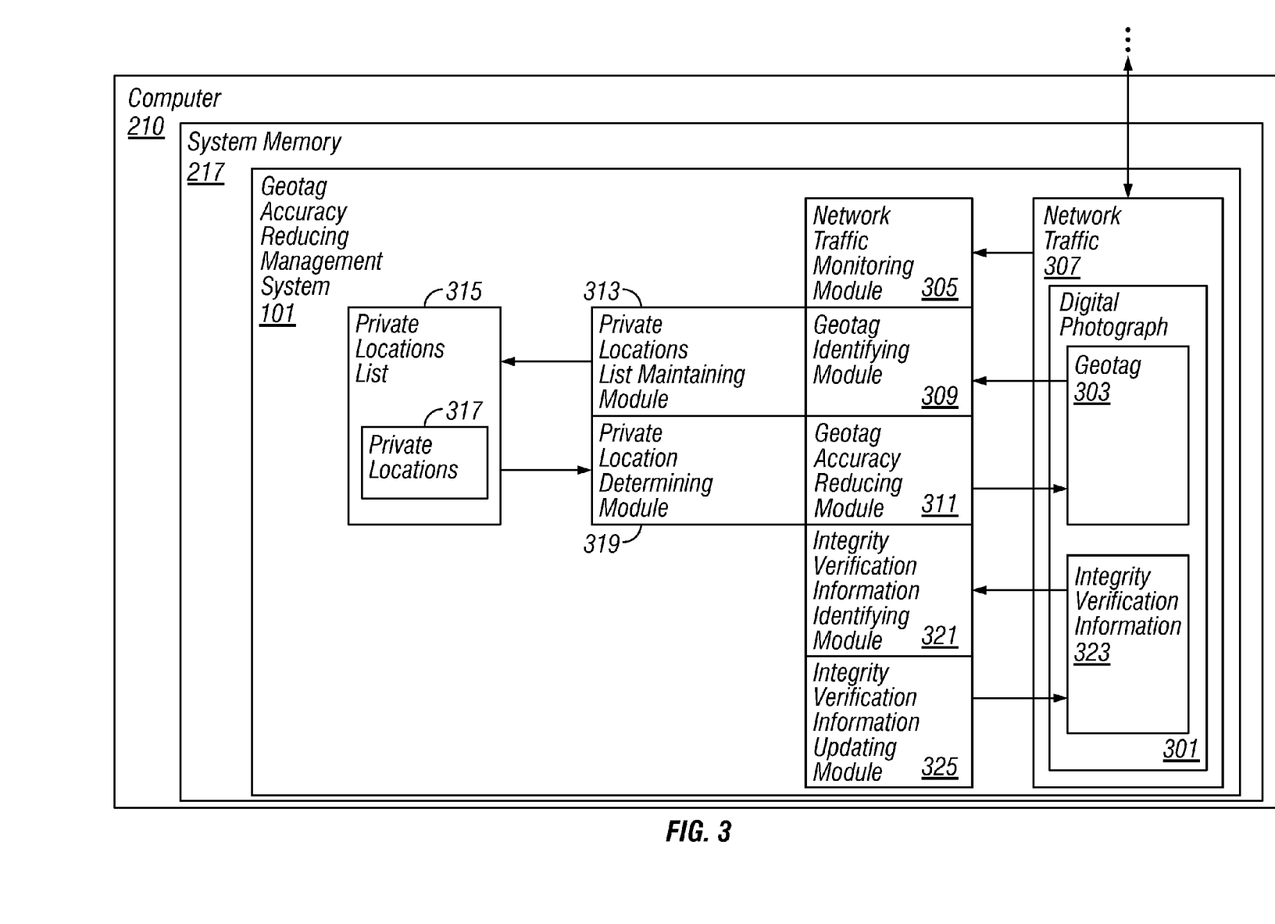
FIG. 3 is a block diagram of the operation of a geotag accuracy reducing management system, according to some embodiments.

FIG. 3 illustrates the operation of a geotag accuracy reducing management system 101 residing in the system memory 217 of a client 103, according to some embodiments. As described above, the functionalities of the geotag accuracy reducing management system 101 can reside on a client 103, a server 105, or be distributed between multiple computer systems 210, including within a cloud-based computing environment in which the functionality of the geotag accuracy reducing management system 101 is provided as a service over a network 107. It is to be understood that although the geotag accuracy reducing management system 101 is illustrated in FIG. 3 as a single entity, the illustrated geotag accuracy reducing management system 101 represents a collection of functionalities, which can be instantiated as a single or multiple modules as desired (an instantiation of specific, multiple modules of the geotag accuracy reducing management system 101 is illustrated in FIG. 3). It is to be understood that the modules of the geotag accuracy reducing management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the geotag accuracy reducing management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the geotag accuracy reducing management system 101 detects the transmission between computers 210 of digital photographs 301 containing geotags 303, and automatically reduces the accuracy of select geotags 303 embedded in digital photographs 301. This can be done as the photographs are transmitted from the client 103, e.g., for upload to a server 105 as illustrated in FIG. 3. In other embodiments, this function can instead be performed as the photographs 301 arrive at the upload target (e.g., a server 105 to which the photographs 301 are being uploaded). In other words, in different embodiments network traffic 107 can be monitored at different points during its transmission, such as, for example, while the network traffic 107 is outbound from a client 103 and/or inbound to a server 105.

A network traffic monitoring module 305 of a client 103 based geotag accuracy reducing management system 101 illustrated in FIG. 3 monitors outbound network traffic 307 from the client 103, in order to enable the identification of the transmission of digital photographs 301 en route to an upload target. In different embodiments, the network traffic monitoring module 305 is implemented as a client 103 based network filter, browser plugin, proxy, or as an in-line network filter that is upstream from the client 103. This enables a geotag identifying module 309 of the geotag accuracy reducing management system 101 to identify geotags 303 embedded in digital photographs 301 in the outbound network traffic 307 from the client 103.

More specifically, the geotag identifying module 309 reads the outbound network traffic 307, and identifies the transmission of file streams that potentially comprise digital photographs 301. It is to be understood that digital photographs 301 are in the form of files in specific formats. The specific file formats comprising digital photographs 301 contain identifiers that indicate the file type. For example, files in the Joint Photographic Experts Group (JPEG) format, currently a common format used for storing digital photographs 301, start with the value 0xFFD8FFE1. Other file formats that commonly comprise digital photographs 301 also have detectable identifiers that indicate the file type. When a file is being transmitted over the network 107, it is in the form of a file stream. The geotag identifying module 309 reads the monitored network traffic 307, and identifies the transmission of file streams likely to comprise digital photographs 301.

Going into greater detail, the geotag identifying module 309 identifies the beginning of a file stream potentially comprising a digital photograph 301 by detecting the presence of the corresponding format identifier (e.g., 0xFFD8FFE1 for a JPEG file) in the network traffic 307. Once the beginning of a file stream potentially comprising the transmission of a digital photograph is identified, the geotag identifying module 309 reads the file stream, looking for geotags 303. Additionally, because the content of the geotags 303 may be modified, an integrity verification information identifying module 321 of the geotag accuracy reducing management system 101 reads the file stream, and identifies and information 323 for verifying data integrity, such as cyclical redundancy checks (CRCs) and check sums. More specifically, the integrity verification information identifying module 321 can identify any integrity verification information 323 such as CRCs or other checksum values that are specific to the given file type being streamed. For example, the JPEG file format, as well as other formats used for storing digital photographs 301, have known CRCs and other checksum values that are of specific formats and appear at specific locations in the files (and hence files streams), and can thus be identified by the integrity verification information identifying module 321. Data in the file stream other than geotags 303 and integrity verification information 323 are allowed to pass to their destination without modification.

When the geotag identifying module 309 identifies a geotag 303 in a file stream potentially comprising a digital photograph 301, the geotag identifying module 309 passes the identified geotag 303 to a geotag accuracy reducing module 311 of the geotag accuracy reducing management system 101. In some cases, the geotag accuracy reducing module 311 modifies the geotag 303 to reduce its accuracy. More specifically, the geotag accuracy reducing module 311 reduces the accuracy of geotags 303 that identify private locations 317.

To this end, a private locations list maintaining module 313 of the geotag accuracy reducing management system 101 maintains a list 315 (or other suitable data structure) of private locations 317. This private locations list 315 is typically editable by a user, and contains locations which are to be kept private by reducing the accuracy of corresponding geotags 303 embedded in digital photographs 301. For example, users would typically add their home addresses to the private location list 315, as well as the addresses (or names, etc.) of other locations to be kept private, such as, e.g., homes of relatives and friends, schools, place of employment, etc. In some embodiment, the private location list 315 can further specify parameters to use for reducing the accuracy of geotags 303 corresponding to specific private locations 317 (e.g., for any digital photographs taken at (or within a specific proximity to) this address, reduce accuracy by, e.g., five miles in a random direction).

When the geotag identifying module 309 identifies a geotag 303, a private location determining module 319 of the geotag accuracy reducing management system 101 compares the location of the geotag 303 with the private locations 317 in the private location list 315. Note that geotags 303 typically are in the form of a latitude and a longitude of a specific location, although other location identifying data can be used, such as coordinates of another system or standard. The private locations 317 in the list 315 are typically entered by users in the form of addresses or place names, although in some instances users might also enter this information in the exact format of a geotag 303 (e.g., latitude and longitude). Where the geotags 303 and private locations 317 are not in the same format, the private location determining module 319 can perform the requisite conversion to determine whether geotags 303 fall within private locations 317. For example, in an embodiment in which geotags 303 comprise latitudes and longitudes and the private locations list 315 comprises addresses and place names, the private location determining module 319 can convert the addresses and place names on the list 315 into ranges of latitudes and longitudes, and subsequently determine whether given identified geotags 303 fall within any of these ranges.

Where a given geotag 303 does not correspond to a private location 317 (e.g., the geotag 303 identifies the location of a public place), the accuracy of the geotag 303 is not reduced, and the geotag 303 is transmitted to its target destination without being modified. However, where it is determined that a given identified geotag 303 does correspond to a location on the private location list 315, the geotag accuracy reducing module 311 reduces the accuracy of the geotag 303, so as to maintain the user's privacy but still convey some useful information concerning the location at which the digital photograph 301 was taken.

The geotag accuracy reducing module 311 can reduce the accuracy of a given geotag 303 by modifying its content (e.g., latitude and longitude) to have a value that still makes sense and is close enough to the original value to be useful, and yet is different enough from the original value to protect the user's privacy. One way in which to reduce the accuracy of a geotag 303 consists of selecting a random direction (e.g., North, South, East or West) and modifying the content of the geotag by a random distance within a specific range (no less than X no more than 2X, where X equals a specific value, such as two miles) along the randomly selected direction from the true location. This would keep the modified location close enough to the true location to provide useful information concerning where the digital photograph 301 was taken, and yet provides enough modification and randomness to protect the user's privacy by hiding the exact location. More complex accuracy reduction calculation functions can also be used, that would be harder to reverse. For example, in one embodiment, when the location indicated by a geotag 303 falls within a given city (or county, region, etc.), the geotag accuracy reducing module 311 replaces the contents of the geotag 303 with contents identifying the exact geographic center (or some other point, such as a specific town square or other public location) of or within the city (or other region). This would be essentially impossible to convert back into the exact private location 317, yet would disclose the city (or other region) in which the picture was taken. In some embodiments, the private location list 315 specifies how to reduce the accuracy for at least some private locations 317. Where the private location list 315 does not so specify for a given private location 317, the geotag accuracy reducing module 311 can use a default accuracy reducing protocol (default for the type of private location 317 such as home address or work place, default for the specific location such as city, or default in general for all locations and location types). Once the geotag accuracy reducing module 311 reduces the accuracy of a geotag 303, it returns the modified geotag 303 to the geotag identifying module 309. The modified geotag 303 is then transmitted to the target as part of the file stream in lieu of the original geotag 303.

When a geotag 303 is modified, any integrity verification information 323 for the file stream identified by the integrity verification information identifying module 321 also has to be modified, to take into account the modification of the geotag 303. Therefore, whenever a geotag 303 is modified and integrity verification information 323 exists for the file stream, an integrity verification information updating module 325 of the geotag accuracy reducing management system 101 updates to the integrity verification information 323 (e.g., any CRCs or other checksum values embedded in the file stream) to ensure that they reflect the modified value of the geotag 303. The updated integrity verification information 323 is then transmitted to the target as part of the file stream.

FIG. 3 illustrates a client 103 based geotag accuracy reducing management system 101 which monitors outbound network traffic 307 from the client 103 and identifies the transmission of digital photographs 301 en route to the upload target. As stated above, in some embodiments, some or all of the modules of the geotag accuracy reducing management system 101 reside on the upload target (e.g., server 105). In these embodiments, the network traffic monitoring module 305 is implemented in a form such as a server based filter, proxy, or "processor," or as an in-line network filter that is downstream from the server 105. In such embodiments, the incoming, server 105 bound network traffic 307 is monitored for digital photographs 301, and the remaining functions are performed as described above.

Figure 4:
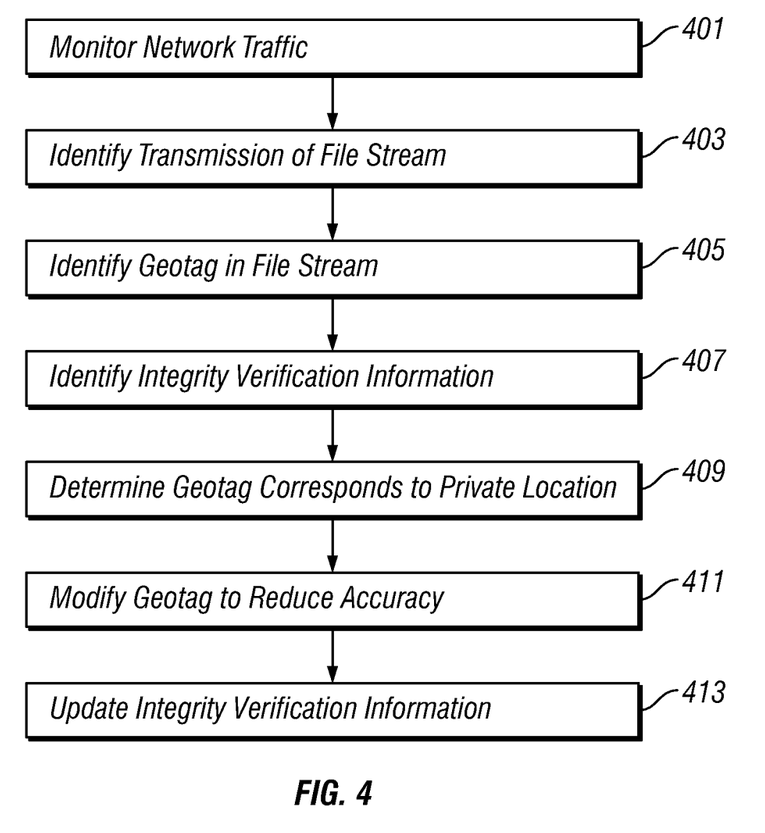
FIG. 4 is a flowchart of the operation of a geotag accuracy reducing management system, according to some embodiments.

FIG. 4 illustrates steps of the operation of the geotag accuracy reducing management system 101 (FIG. 1), according to some embodiments. The network traffic monitoring module 305 (FIG. 3) monitors 401 network traffic 307 (FIG. 3) between a client 103 (FIG. 1) and a server 105 (FIG. 1). The geotag identifying module 309 (FIG. 3) identifies 403 transmission of a file stream comprising a digital photograph 301 (FIG. 3) in the monitored network traffic 307 (FIG. 3). The geotag identifying module 309 (FIG. 3) also identifies 405 a geotag 303 (FIG. 3) in the identified file stream. The integrity verification information identifying module 321 (FIG. 3) identifies 407 integrity verification information 323 (FIG. 3) in the file stream. The private location determining module 319 (FIG. 3) determines 409 that the identified geotag 303 (FIG. 3) corresponds to a private location 317 (FIG. 3). The geotag accuracy reducing module 311 (FIG. 3) modifies 411 the geotag 303 (FIG. 3), so as to reduce its accuracy. The integrity verification information updating module 325 (FIG. 3) updates 413 the integrity verification information 323 (FIG. 3) to account for the modified geotag 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for strategically reducing the accuracy of geotag information embedded in digital photographs, the method comprising the steps of:
   monitoring network traffic between at least one client and at least one server;
   identifying, by at least one computer, transmission of a file stream in the monitored network traffic, said identified file stream comprising a digital photograph;
   identifying, by the at least one computer, a geotag in the identified file stream;
   identifying, by the at least one computer, integrity verification information in the identified file stream;
   determining, by the at least one computer, that the identified geotag corresponds to a private location;
   modifying, by the at least one computer, the identified geotag and reducing accuracy of its content;
   wherein modifying, by the at least one computer, the identified geotag and reducing accuracy of its content further comprises:
   selecting a random direction;
   selecting a random distance within a specific range; and
   modifying the content of the geotag by the selected random distance along the selected random direction; and
   updating, by the at least one computer, the integrity verification information to account for the modified geotag.

2. The method of claim 1 wherein monitoring network traffic between at least one client and at least one server further comprises:
   monitoring network traffic outbound from a client.

3. The method of claim 1 wherein monitoring network traffic between at least one client and at least one server further comprises:
   monitoring network traffic inbound to a server.

4. The method of claim 1 wherein identifying, by the at least one computer, transmission of a file stream in the monitored network traffic, said identified file stream comprising a digital photograph, further comprises:
   detecting, by the at least one computer, an identifier of a specific file format comprising a digital photograph.

5. The method of claim 1 wherein identifying, by the at least one computer, integrity verification information in the identified file stream further comprises:
   identifying, by the at least one computer, at least one cyclical redundancy check specific to a file format comprising a digital photograph.

6. The method of claim 1 wherein identifying, by the at least one computer, integrity verification information in the identified file stream further comprises:
   identifying, by the at least one computer, at least one checksum specific to a file format comprising a digital photograph.

7. The method of claim 1 further comprising:
   maintaining, by the at least one computer, a private locations list, said private locations list containing at least one location to be kept private by geotag accuracy reduction in digital photographs.

8. The method of claim 7 wherein determining, by the at least one computer, that the identified geotag corresponds to a private location further comprises:
comparing a location of the identified geotag to content of the private locations list.

9. The method of claim 7 wherein:
said private locations list further contains, for at least one location to be kept private by geotag accuracy reduction in digital photographs, a specific directive for reducing the accuracy of geotags corresponding to the at least one location.

10. The method of claim 7 wherein modifying, by the at least one computer, the identified geotag so as to reduce accuracy of its content further comprises:
determining that the geotag corresponds to a specific private location on the private locations list; and
modifying the content of the geotag according to a specific directive for reducing the accuracy of geotags corresponding to the specific location, said specific directive being on the private locations list.

11. The method of claim 1 wherein modifying, by the at least one computer, the identified geotag so as to reduce accuracy of its content further comprises:
determining that the geotag corresponds to a private location within a specific region; and
modifying the content of the geotag to identify a specific point not comprising a private location within the specific region.

12. At least one non-transitory computer readable medium containing a computer program product for strategically reducing the accuracy of geotag information embedded in digital photographs, the computer program product comprising:
program code for monitoring network traffic between at least one client and at least one server;
program code for identifying transmission of a file stream in the monitored network traffic, said identified file stream comprising a digital photograph;
program code for identifying a geotag in the identified file stream;
program code for identifying integrity verification information in the identified file stream;
program code for determining that the identified geotag corresponds to a private location;
program code for modifying the identified geotag and reducing accuracy of its content;
wherein the program code for modifying the identified geotag and reducing accuracy of its content further comprises:
program code for selecting a random direction;
program code for selecting a random distance within a specific range; and
program code for modifying the content of the geotag by the selected random distance along the selected random direction; and
program code for updating the integrity verification information to account for the modified geotag.

13. The computer program product of claim 12 wherein the program code for identifying transmission of a file stream in the monitored network traffic, said identified file stream comprising a digital photograph, further comprises:
program code for detecting an identifier of a specific file format comprising a digital photograph.

14. The computer program product of claim 12 further comprising:

program code for maintaining a private locations list, said private locations list containing at least one location to be kept private by geotag accuracy reduction in digital photographs.

15. The computer program product of claim 14 wherein:
said private locations list further contains, for at least one location to be kept private by geotag accuracy reduction in digital photographs, a specific directive for reducing the accuracy of geotags corresponding to the at least one location.

16. The computer program product of claim 14 wherein the program code for modifying the identified geotag so as to reduce accuracy of its content further comprises:
program code for determining that the geotag corresponds to a specific private location on the private locations list; and
program code for modifying the content of the geotag according to a specific directive for reducing the accuracy of geotags corresponding to the specific location, said specific directive being on the private locations list.

17. The computer program product of claim 12 wherein the program code for modifying the identified geotag so as to reduce accuracy of its content further comprises:
program code for determining that the geotag corresponds to a private location within a specific region; and
program code for modifying the content of the geotag to identify a specific point not comprising a private location within the specific region.

18. A computer system for strategically reducing the accuracy of geotag information embedded in digital photographs, the computer system comprising:
a processor;
system memory;
a network traffic monitoring module residing in the system memory, the network traffic monitoring module being configured for monitoring network traffic between at least one client and at least one server;
a geotag identifying module residing in the system memory, the geotag identifying module being configured for identifying transmission of a file stream comprising a digital photograph in the monitored network traffic, and for identifying a geotag in the identified file stream;
an integrity verification information identifying module residing in the system memory, the integrity verification information identifying module being configured for identifying integrity verification information in the identified file stream;
a private location determining module residing in the system memory, the private location determining module being configured for determining that the identified geotag corresponds to a private location;
a geotag accuracy reducing module residing in the system memory, the geotag accuracy reducing module being configured for modifying the identified geotag and reducing accuracy of its content;
wherein the geotag accuracy reducing module being configured for modifying the identified geotag and reducing accuracy of its content further configured for:
selecting a random direction;
selecting a random distance within a specific range; and
modifying the content of the geotag by the selected random distance along the selected random direction; and
an integrity verification information updating module residing in the system memory, the integrity verification information updating module being configured for updating the integrity verification information to account for the modified geotag.

\* \* \* \* \*